April 27, 1965 C. A. BROWN ETAL 3,180,710
GAS GENERATOR
Filed Feb. 11, 1963
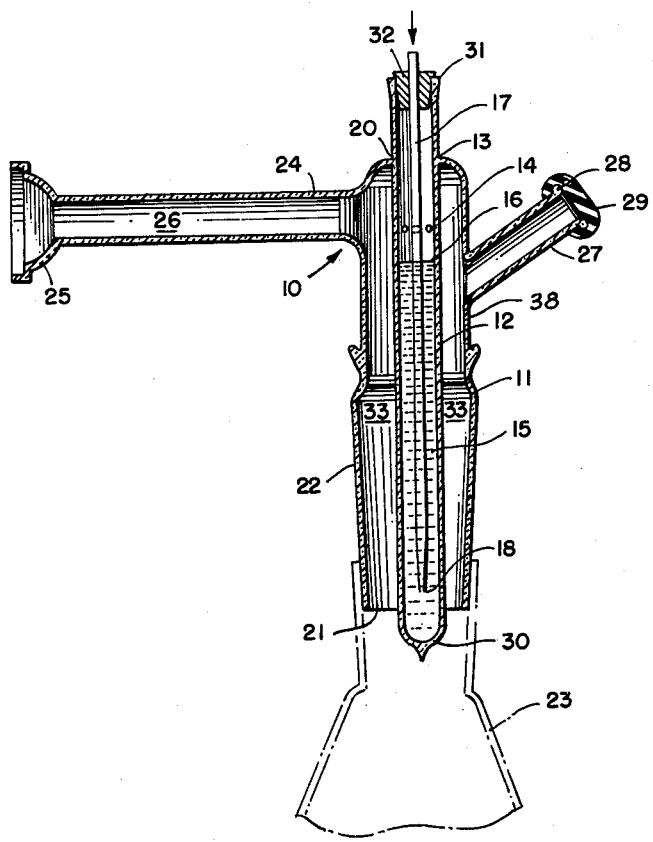
INVENTORS:
CHARLES A. BROWN
HERBERT C. BROWN
BY Bair, Freeman & Molinare ATT'YS ＃ 3,180,710
GAS GENERATOR
Charles A. Brown and Herbert C. Brown, both of 1840 Garden St., West Lafayette, Ind.
Filed Feb. 11, 1963, Ser. No. 257,549
8 Claims. (Cl. 23—282)

This invention relates to a valve for controlling the addition of a fluid to a substantially closed gas-generating system, and it particularly relates to a valve useful for supplying a fluid reactant, in a substantially closed system, to a second reactant disposed within a reaction vessel in order to generate a gaseous product.

Heretofore, it has been almost universal practice to use a Kipp generator for generating gas in the laboratory. However, the Kipp generator actually leaves much to be desired for its intended purpose. For example, it is limited for use only with solid lumps and a liquid to produce the desired gas. This limitation is further complicated by the fact that only those solid reactants which are insoluble in the liquid reactant, but whose reaction products are soluble, may be used. Furthermore, solid lumps of chemicals often contain impurities which are likely to generate unwanted gases. Therefore, it would clearly be highly advantageous if a valve could be provided for overcoming the above-mentioned disadvantages, while at the same time providing a valve which generates a more constant, even flow of gas than is now provided by known gas generating devices.

Therefore, it is a primary object of this invention to provide a valve for controlling the flow of a fluid reactant into a gas generating system so as to provide a more constant flow of gas.

It is also an object of this invention to provide a valve for a gas generating system which is adapted to use either a liquid or a gas as one reactant and either a liquid or a solid as the second reactant.

It is a further object of this invention to provide a pressure controlled valve for supplying a liquid or gas reactant to a gas generating system, upon demand from the system.

It is another object of this invention to provide a pressure controlled valve which is simply constructed and economically produced.

Further purposes and objects of this invention will appear as the specification proceeds.

One embodiment of the present invention is illustrated in the accompanying sectional drawing of our valve.

Generally, our valve 10, which accomplishes all of the foregoing objects includes an outer container 11 which communicates with a closed gas-generating system, an inner well 12 sealably carried by the outer container 11 at 13 and having openings 14 which are directed into the interior of outer container 11, a liquid 15 disposed within the well 12 and having an upper liquid level 16 which is positioned below the openings 14, and a tube 17 for supplying a fluid reactant to the closed system, the tube 17 having an open end 18 positioned below the upper liquid level 16, whereby the desired fluid reactant is passed into the system through the delivery end 18 of the tube 17, then upwardly through the dense liquid 15, and finally outwardly through the lateral openings 14 into the interior of the outer container 10. The flow of fluid commences when the pressure of the supply fluid exceeds the total pressure provided by the elevation pressure of the liquid 15 and by the pressure of the closed system.

The outer container 11 is generally cylindrical in shape and is provided with a closed upper end 20 and an open lower end 21. The lower portion 22 of the outer container 11 is desirably slightly tapered so that it may be sealably positioned within a reaction vessel, such as a flask 23.

A side arm 24, positioned near the upper end 20 of the outer container 11, provides an escape for gases being generated in the flask 23. The side arm 24 is provided with a flanged portion 25 which is adapted to meet a similar flange on a mating part. The passageway 26 in the side arm 24 allows the generated gas to pass to the area where it is being stored or used, such as in a hydrogenating process.

Furthermore, it is desirable that an upwardly angled port opening 27 be provided in the upper portion 38 of the outer container 11 so that various materials may be added to the flask 23 without the necessity of actually removing the outer container 11 from the flask 23. A beaded edge 28 is provided on the open end of the port 27 so that a rubber stopper 29 may be placed in sealing engagement with the side port 27 while the valve 10 is in use.

The inner well 12 is generally cylindrical in shape and is provided with a closed lower end 30 and an open upper end 31, which is adapted to be sealed by a stopper 32. As previously mentioned, the inner well 12 itself is sealably carried by the closed upper end 20 of the outer container 11, at 13. Shortly below the circumferential sealing of the inner well, a number of openings 14 are laterally positioned for allowing a liquid or gas reactant to pass from the interior of the inner well 12 and then down into the reaction vessel 23. Desirably, the openings 14 are uniformly spaced around the cylindrical wall of the inner well 12 and are generally of uniform size. It is preferred that the inner well 12 be centrally located within the outer container 11 so as to provide an annular opening 33 between the outer surface of the inner well 12 and the inner surface of the outer container 11. The annular opening 33 allows free downward passage of the fluid reactant into the reaction vessel 23, and likewise allows free upward passage of generated gas from the reaction vessel 23. Conveniently, an etched mark (not shown) is provided on the well 12 at the level desired for the upper liquid level 16.

The inner well 12 is filled to the etched mark with a liquid 15. First, it is highly advantageous that the liquid 15 be of a relatively high density so that it will provide an adequate elevation pressure barrier between the pressure of the generated gas in the closed system and the pressure of the fluid reactant. The pressure of the column of liquid 15 functions in cooperation with the system pressure for regulating the flow of fluid reactant through the tube 15. The more dense the liquid, the less depth of liquid is required to provide the desired elevation pressure. Furthermore, not only is less liquid required as the density increases, but also the inner well 12 itself may be of a minimum height. Furthermore, the liquid 15 is desirably of low volatility so that little, if any, liquid vaporizes as gas is being generated. Vaporization of the liquid 15 not only contaminates the generated gas, but it also adversely affects the proper operation of the valve itself since the distance between the upper liquid level 16 and the delivery end 18 of the central supply tube 17 decreases, thereby decreasing the elevation pressure of the column of liquid 15. In using the valve 10, it has been found to be particularly advantageous to use mercury, which generally satisfies the desired characteristics for the liquid 15.

The supply tube 17 is sealably carried by the upper end 31 of the inner well 12, as by passing through the stopper 32. Near the delivery end 18, the tube 17 is slightly tapered so that it readily passes through a stopper 32. The delivery end 18 is positioned below the upper liquid level 16, the actual depth being determined by the desired difference between the system pressure and the fluid supply pressure. The greater the distance between the upper level 16 and the delivery end 18, the greater is the difference between the desired system pressure and the pressure of the fluid reactant supply. The fluid supply tube 17 is directed to a reservoir containing a gas or a liquid. When a liquid is used, the liquid may be under either atmospheric pressure or gauge pressure. When gas is used, the reservoir will be provided with gauge pressure so that the gas may be passed into the closed system.

Since the valve 10 is particularly useful in the laboratory for generating gases, such as hydrogen, it is preferred that the inner well 12 and the outer container 11, including the side arm 24 and side port 27, be integral and be constructed of glass. However, it is to be understood that a similar valve 10 may be constructed of a more sturdy material, such as stainless steel, so as to be useful in a high pressure system. Also, the valve is readily useable in a vacuum system. This may be done merely by inserting the fluid supply tube 17 rather deeply into the liquid 15 so as to provide a substantial elevation pressure, whereby the fluid supply pressure is substantially higher than the partial vacuum in the closed system.

It is to be noted that the reactant fluid useable with the valve 10 is either liquid or gas and the reactant disposed in the reaction vessel 23 may be a slurry of a solid and a liquid or a liquid. This, of course, greatly increases the flexibility of the gas generating system since a large variety of reactants may be used for generating a great number of gases. Among the many gases that may be generated by using the valve 10 are hydrogen, carbon dioxide, hydrogen sulphide, hydrogen selenide, hydrogen telluride, sulphur dioxide, hydrogen chloride, hydrogen bromide, hydrogen iodide, chlorine, bromine, oxygen, ammonia, phosphine, arsine, diborane, carbon monoxide, and silane. It should be noted that many of these gases would be difficult if not impossible to generate in a Kipp generator.

In operating the valve 10, the inner well 12 is first filled with mercury 15 to the etched mark, so that the upper liquid level 16 is positioned somewhat below the openings 14 of the inner well. A stopper 32, through which the central supply tube 17 passes, is placed into sealing engagement with the upper end 31 of the inner well 12 and the delivery end 18 is inserted below the upper liquid level 16 and is positioned at the depth which provides the desired elevation pressure.

After the reaction flask 23 is filled with the desired reactant and after the reaction has started generating the desired gas, the system begins to build up a pressure. When the system pressure plus the elevation pressure of the liquid 15 exceeds the fluid reactant pressure, the flow of fluid reactant stops. As the generated gas is drawn off through the passageway 26, the system pressure decreases, and, when it reaches the point where the system pressure plus the elevation pressure of the column of liquid 15 is less than the fluid reactant pressure, fluid begins again to flow downwardly through the supply tube 17, upwardly through the liquid 15, outwardly through the openings 14, and downwardly through the annular opening 33 to the reactant contained in the vessel 23. Again, when the system pressure builds up, the flow of fluid reactant stops until the system pressure again drops, allowing the flow of additional fluid reactant.

It should be readily apparent from the above description that the described valve 10 overcomes all the disadvantages of the prior art generators and accomplishes all of the aforementioned objects. The described valve is highly flexible as it can use a great variety of liquid or gaseous reactants. Furthermore, the valve provides a very even and constant flow of fluid reactant and thereby provides a very even and constant flow of generated gas. Since the valve is not limited to the use of solid lumps of material, impurities are kept at a minimum, so that the gas being generated is substantially pure. Also, it is to be noted that the system provides an automatic safety feature since the supply of reactant to the system is immediately cut off when the system pressure builds up to a dangerous point.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States is:

1. A valve for supplying a fluid reactant to a substantially closed gas-generating system, said valve comprising an outer container in communication with said system, an inner well sealably carried by said outer container and having openings in its upper portion only directed into said outer container, a liquid disposed within said well and having an upper liquid level positioned below said openings, and a tube for supplying a fluid reactant to said system, said tube having an open end positioned below the upper level of said liquid, whereby said fluid is passed into said system through said tube and said liquid as the pressure acting against said fluid exceeds the total pressure provided by the elevation pressure of said liquid and the pressure of said system.

2. The valve of claim 1 wherein said liquid is a dense liquid of low volatility.

3. A valve for supplying fluid reactant to a substantially closed gas-generating system, said valve comprising an outer container in communication with said system, an inner well sealably carried by said outer container and having openings in its upper portion only directed into said outer container, mercury disposed within said well and having an upper liquid level positioned below said openings, and a tube for supplying a fluid reactant to said system, said tube having an open end positioned below the upper level of said mercury, whereby said fluid is passed into said closed system through said tube and said liquid as the pressure acting against said fluid exceeds the total pressure provided by the elevation pressure of the mercury and the pressure of the system.

4. A valve for supplying a fluid reactant, in a substantially closed system, to a second reactant disposed in a reaction vessel so as to provide a gaseous product, said valve comprising an outer container in communication with said system and being carried by said reaction vessel, an inner well sealably carried by said outer container and having openings in its upper portion only directed into said outer container, a dense liquid of low volatility disposed within said well, the upper level of said liquid being below said openings, and a tube for supplying said fluid reactant to said system, said tube having a delivery end positioned below the upper level of said liquid, whereby said fluid reactant is supplied to said second reactant by passing through said dense liquid and through said openings as the pressure of said fluid reactant exceeds the total pressure exerted by the elevation pressure of said liquid and the pressure of said closed system.

5. A valve for supplying a fluid reactant, in a substantially closed system, to a second reactant disposed in a reaction vessel so as to provide a gaseous product, said valve comprising an outer container in communication with said system and being sealably carried by said reaction vessel, an inner well sealably carried by said outer container and having openings in its upper portion only directed into said outer container, mercury disposed within said well, the upper level of said mercury being below said openings, and a tube for supplying said fluid reactant to said system, said tube having a delivery end positioned below the upper level of said mercury, whereby said fluid reactant is supplied to said second reactant by passing through said mercury and through said openings as the pressure of said fluid reactant exceeds the total pressure exerted by the elevation pressure of said mercury and the pressure of said closed system.

6. A valve for supplying a fluid reactant to a substantially closed gas generating system, said valve comprising an outer container in communication with said system, an inner container sealably carried by said outer container, communicating means from said inner container to said outer container in the upper portion only of said inner container, a liquid disposed within said liquid container, the upper level of said liquid being positioned below said communicating means, and conduit means for delivering said fluid reactant to said valve, said conduit means having an open end positioned below the upper level of liquid, whereby said fluid reactant is passed into said system through said tube and said liquid as the pressure acting against said fluid exceeds the total pressure provided by the elevation pressure of said liquid and the pressure of said system.

7. A valve for supplying a fluid reactant, in a substantially closed system, to a second reactant located within a reaction vessel for producing a gaseous product, said valve comprising a substantially cylindrical, elongated, outer container which is in communication with said system, the lower end of said outer container being in substantially sealed relationship with said reaction vessel, an elongated inner well carried annularly of said outer container, said well extending through the upper end of said outer container and being integral therewith whereby said well is maintained in substantially sealed relationship with the upper end of said outer container, a plurality of openings in the upper portion only of said well, said openings providing communication between the space enclosed by said inner well and the annular space located between said inner well and said outer container, mercury disposed within said well, the upper level of said mercury being below said openings, and an elongated delivery tube for supplying fluid reactant to said system, said tube being sealably carried by the upper end of said well and passing downwardly through said well, said tube having an open lower end positioned below the upper level of said mercury, whereby said fluid reactant is supplied to said second reactant upon passing through said mercury, through said openings, and down through the annular space between said outer container and said inner well as the pressure of said fluid reactant exceeds the total pressure exerted by the elevation pressure of said mercury and the pressure in said closed system.

8. The valve of claim 7 wherein an outlet passageway is provided in said outer container for permitting the escape of generated gases, and a port is provided in said outer container for adding various reactants to said reaction vessel.

References Cited by the Examiner

UNITED STATES PATENTS

| 280,155 | 6/83 | Edwards | 137—251 |
| 1,724,279 | 8/29 | Gruber | 137—251 |

FOREIGN PATENTS 465,444  9/51  Italy.

MORRIS O. WOLK, *Primary Examiner.*

JAMES H. TAYMAN, Jr., *Examiner.*